US010464574B2

(12) United States Patent
Geißenhöner et al.

(10) Patent No.: US 10,464,574 B2
(45) Date of Patent: Nov. 5, 2019

(54) METHOD AND MONITORING APPARATUS FOR OPERATING A MOTOR VEHICLE

(71) Applicant: AUDI AG, Ingolstadt (DE)

(72) Inventors: Martin Geißenhöner, Ingolstadt (DE); Carl Johannes Schlockermann, München (DE)

(73) Assignee: AUDI AG, Ingolstadt (DE)

(*) Notice: Subject to any disclaimer, the term of this patent is extended or adjusted under 35 U.S.C. 154(b) by 0 days.

(21) Appl. No.: 15/758,058

(22) PCT Filed: Nov. 8, 2016

(86) PCT No.: PCT/EP2016/077021
§ 371 (c)(1),
(2) Date: Mar. 7, 2018

(87) PCT Pub. No.: WO2017/084917
PCT Pub. Date: May 26, 2017

(65) Prior Publication Data
US 2018/0244283 A1 Aug. 30, 2018

(30) Foreign Application Priority Data
Nov. 17, 2015 (DE) .................. 10 2015 222 624

(51) Int. Cl.
*B60W 50/14* (2012.01)
*B60W 50/02* (2012.01)

(52) U.S. Cl.
CPC .... *B60W 50/0225* (2013.01); *B60W 50/0205* (2013.01); *B60W 50/14* (2013.01);
(Continued)

(58) Field of Classification Search
None
See application file for complete search history.

(56) References Cited

U.S. PATENT DOCUMENTS

2004/0010361 A1  1/2004  Gierer et al.
2011/0066323 A1* 3/2011  Nishimura ............. F16H 61/12
                                                 701/33.4
(Continued)

FOREIGN PATENT DOCUMENTS

CN  101947953 A  1/2011
CN  102596661 A  7/2012
(Continued)

OTHER PUBLICATIONS

Translation of International Preliminary Report on Patentability dated May 31, 2018 of corresponding International Application No. PCT/EP2016/077021; 13 pgs.
(Continued)

*Primary Examiner* — Justin Holmes
(74) *Attorney, Agent, or Firm* — Maier & Maier, PLLC

(57) ABSTRACT

A method for operating a motor vehicle, for which it is monitored whether a communication failure is present between a transmission control instrument of an automatic transmission of the motor vehicle, a selector lever control instrument of the automatic transmission, and/or a parking brake control instrument of an electronic parking brake of the motor vehicle, and/or whether, on account of a malfunction of the automatic transmission itself and/or on account of a malfunction of a selector lever itself for selection of drive stages of the automatic transmission, a parking position of the automatic transmission cannot be engaged.

9 Claims, 1 Drawing Sheet

(52) U.S. Cl.
CPC . *B60W 2050/021* (2013.01); *B60W 2050/146* (2013.01); *B60W 2510/06* (2013.01); *B60W 2510/188* (2013.01)

(56) References Cited

U.S. PATENT DOCUMENTS

| | | | | |
|---|---|---|---|---|
| 2011/0137534 | A1* | 6/2011 | Kim | B60K 20/02 |
| | | | | 701/62 |
| 2013/0110365 | A1* | 5/2013 | Kimura | F16H 61/12 |
| | | | | 701/65 |
| 2013/0151092 | A1* | 6/2013 | Spaulding | F16H 59/0217 |
| | | | | 701/55 |
| 2015/0041280 | A1* | 2/2015 | Schuller | F16H 63/483 |
| | | | | 192/219.4 |
| 2015/0233472 | A1* | 8/2015 | Kinoshita | F16H 61/662 |
| | | | | 701/53 |
| 2015/0321551 | A1* | 11/2015 | Hendry | B60K 20/06 |
| | | | | 701/62 |

FOREIGN PATENT DOCUMENTS

| | | |
|---|---|---|
| CN | 104340216 A | 2/2015 |
| DE | 100 23 070 A1 | 12/2001 |
| DE | 10 2007 028 567 A1 | 2/2008 |
| DE | 10 2008 018 470 A1 | 10/2009 |
| DE | 10 2008 029 891 A1 | 2/2010 |
| DE | 10 2010 007 899 B4 | 5/2014 |
| DE | 20 2013 004 420 U1 | 10/2014 |
| EP | 2 361 812 B1 | 11/2012 |
| GB | 2 423 800 A | 9/2006 |
| WO | 99/46520 A1 | 9/1999 |
| WO | 2007/043957 A1 | 4/2007 |
| WO | 2015/090568 A1 | 6/2015 |

OTHER PUBLICATIONS

German Examination Report dated Aug. 11, 2016 of corresponding German application No. 10 2015 222 624.7; 6 pgs.
Witten Opinion of the International Search Authority dated Jul. 5, 2017 of corresponding International Application No. PCT/EP2016/077021; 15 pgs.
International Search Report dated Jul. 5, 2017 of corresponding International Application No. PCT/EP2016/077021; 13 pgs.
Chinese Office Action dated Apr. 29, 2019, in connection with corresponding CN Application No. 201680062154.0 (19 pgs., including English translation).

* cited by examiner

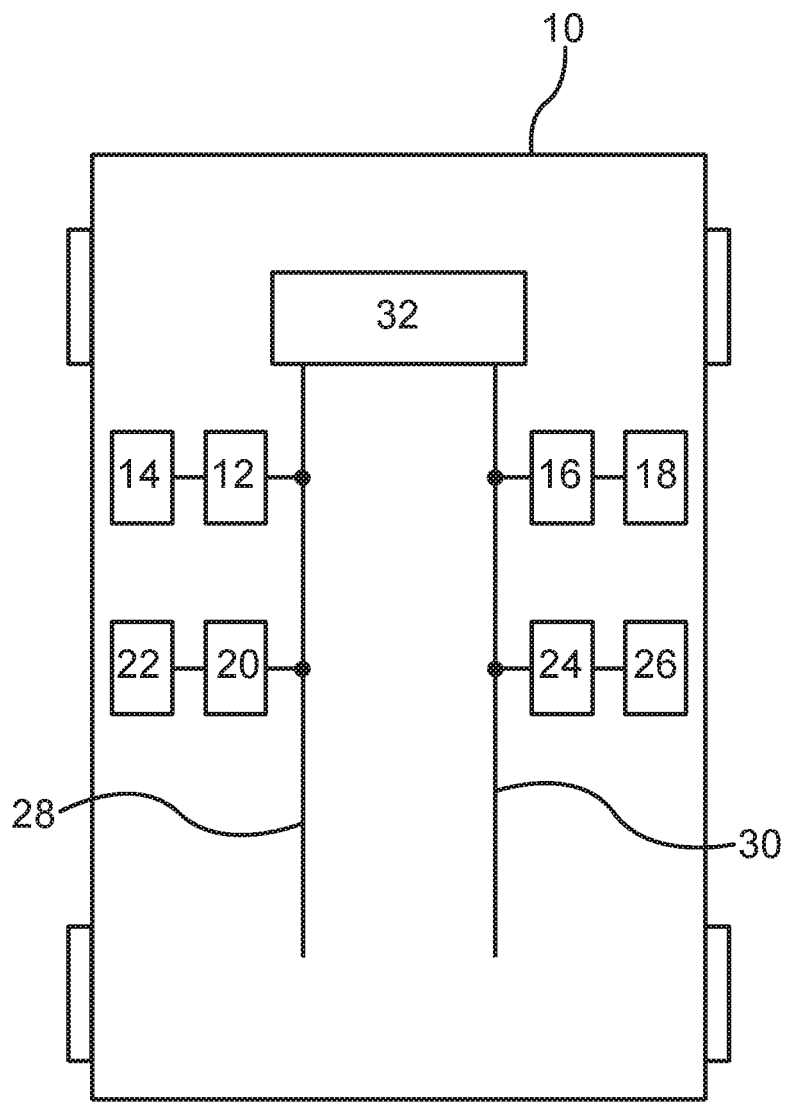

METHOD AND MONITORING APPARATUS FOR OPERATING A MOTOR VEHICLE

FIELD

The invention relates to a method and a monitoring apparatus for operating a motor vehicle. Furthermore, the invention relates to a motor vehicle having a monitoring apparatus of this kind.

BACKGROUND

For motor vehicles with an automatic transmission, a driver can usually engage a park stage in the automatic transmission after the motor vehicle has been parked and/or pull an electronic parking brake in order to prevent the motor vehicle from rolling. For selection of the park stage, the driver can usually actuate a selector lever, with the selector lever actuation being detected via a selector lever control instrument and then being conveyed to a transmission control instrument, which ultimately brings about engagement of the park stage. However, communication errors can ensue, so that, for example, the park stage of the automatic transmission can no longer be engaged and/or the electronic park stage can no longer be pulled. Beyond this, when communication errors of this kind occur, it can also happen that a driver receives no warning relating to the existing malfunction in regard to the automatic transmission and/or the electronic parking brake. In the event of an error, a safe parking of the motor vehicle can thereby be made difficult or, under certain circumstances, even made impossible, without the driver being alerted to this fact.

DE 10 2010 007 899 B4 shows a method for operating a motor vehicle. In the case that the motor vehicle has been braked all the way to a stop by means of an automatic longitudinal guidance system, an electronic parking brake of the motor vehicle is activated. In the case that a malfunction is thereby detected on the electronic parking brake, either a park stage of an automatic transmission of the motor vehicle is engaged automatically or an alert is output by means of a display device of the motor vehicle to engage manually the park stage of the automatic transmission.

DE 10 2008 018 470 A1 shows an apparatus for actuating a parking lock of a motor vehicle. By means of two mutually independent control units, an actuation of the parking lock can occur. For this purpose, a separate actuating means for actuation of the parking lock is associated with each of the control units. The two control units can communicate with each other via a bus connection of the motor vehicle. Once a faulty operation of one of the two control units is detected, a corresponding fault message can be output to a driver of the motor vehicle.

EP 2 361 812 B1 shows a method for operating a utility vehicle. In the case that, during an automatic actuation of an emergency brake of the utility vehicle in the course of a test cycle, it is detected that the utility vehicle does not stand still, an error signal is transmitted to a control instrument. In consequence thereof, the control instrument engages an operating brake of the utility vehicle. Beyond this, it can be provided that a signal pertaining to the error signal is output to a driver of the utility vehicle.

SUMMARY

The problem of the present invention is to provide a solution for parking a motor vehicle having an automatic transmission such that the motor vehicle is secured against rolling.

In the method according to the invention for operating a motor vehicle, it is monitored whether there is present a communication failure between a transmission control instrument of an automatic transmission of the motor vehicle, a selector lever control instrument of the automatic transmission, and/or a parking brake control instrument of an electronic parking brake of the motor vehicle. A communication failure in the sense of the invention is understood, in particular, to mean that a communication breakdown between the control instruments in question is present; that is, signals cannot be transmitted between the control instruments. Alternatively or additionally, it is monitored whether, on account of a malfunction of the automatic transmission itself and/or on account of a malfunction of a selector lever itself for selection of drive stages of the automatic transmission, a parking position of the automatic transmission cannot be engaged. The transmission control instrument, the parking control instrument, and a display control instrument of a display device of the motor vehicle are operated depending on the monitored control instruments between which a communication failure has been detected and/or depending on whether the parking position cannot be engaged on account of a malfunction of the automatic transmission itself and/or on account of a malfunction of the selector lever itself.

By means of the method according to the invention, a redundancy concept for securing a parked motor vehicle against rolling is provided, wherein the securing of the parked motor vehicle against rolling is distributed over the transmission control instrument, the parking control instrument, and the display control instrument. Based on the communication monitoring of the transmission control instrument, of the selector lever control instrument, and of the parking brake control instrument, the transmission control instrument, the parking control instrument, and the display control instrument are actuated, so that a securing of the parked motor vehicle against rolling can be made possible. A communication failure is understood, in particular, to mean that the control instruments in question cannot transmit any control signals for actuating the functional units assigned to them. In the case of the transmission control instrument, this may mean that the transmission control instrument cannot actuate the automatic transmission to engage or alter a gear stage. In the case of the selector lever control instrument, this may mean that a signal relating to an actuation of a selector lever for selecting a gear stage of the automatic transmission cannot be detected by the selector lever control instrument and/or cannot be transmitted to the transmission control instrument. In the case of the parking brake control instrument, a communication failure may mean that the parking brake control instrument cannot actuate the electronic parking brake for activating the parking brake.

Owing to the fact that, alternatively or additionally, it is monitored whether, on account of a malfunction of the automatic transmission itself and/or on account of a malfunction of the selector lever itself, a parking position cannot be engaged, it is possible, in addition, also to detect cases in which, although a communication between the control instruments in question is not disrupted, a securing of the parked motor vehicle against rolling could nonetheless be impaired. For example, it could be the case that an engagement of the parking position is not possible on account of a malfunction at the automatic transmission itself because, for example, a mechanical problem exists in the automatic transmission. In a case of this kind, in spite of a correct actuation of the automatic transmission by the transmission control instrument, it would not be possible to engage the parking position. In addition, it could also be that a malfunction of the selector lever itself is present, because, for example, a button for selecting the parking position is defective, whether on account of mechanical or electronic impairment. In a case of this kind, in spite of a corresponding actuation of the selector lever, it would not be possible to engage the parking position in the automatic transmission.

By way of the solution in accordance with the invention, therefore, a secure parking of the motor vehicle is made possible even for a communication breakdown between the monitored control instruments. For securing the parked vehicle against rolling, there occur here preferably driver warnings, automatic holding functions of the motor vehicle by means of the electronic parking brake, and/or automatic holding functions by means of the automatic transmission. In particular, the different control instruments can be divided among different bus segments, wherein, by means of the method according to the invention, an optimal division of error handling can be provided. Furthermore, it is possible by way of the solution in accordance with the invention, also to monitor whether, on account of malfunctions of the selector lever or of the automatic transmission, a secure parking of the motor vehicle could be impaired, so that, for example, an automatic holding function of the motor vehicle by means of the electronic parking brake can be achieved in cases of this kind. Should a malfunction be detected at the selector lever, it can be provided, for example, that the selector lever control instrument emits a corresponding signal to the parking brake control instrument, in consequence of which the electronic parking brake is activated. Should a malfunction be detected at the automatic transmission, it may be provided, for example, that the transmission control instrument emits a corresponding signal to the parking brake control instrument, in consequence of which the electronic parking brake is activated.

An advantageous embodiment of the invention provides that the display control instrument actuates the display device for display of a warning message, by means of which it is signaled that the driver should engage the parking position in the automatic transmission if it is detected that a communication failure is present in the parking brake control instrument. The display device can involve, for example, an instrument panel (this is called 'cluster') of the motor vehicle, so that a driver of the motor vehicle can recognize the warning message especially well. However, the display device may also involve other displays arranged in the motor vehicle, such as, for example, a display in a center console or the like. Thus, if a communication failure in the parking brake control instrument is detected, then a driver can recognize through said warning message in a simple way that, as a precaution, it would be better if the driver engaged the parking position in the automatic transmission, because a disruption just then is present in the parking brake control instrument. In this way, it is possible to prevent the motor vehicle from rolling in the event of an error in the parking brake control instrument.

Another advantageous embodiment of the invention provides that the display control instrument actuates the display device for display of a warning message, by means of which it is signaled that the driver should actuate the electronic parking brake if it is detected that a communication failure is present in the transmission control instrument and/or in the selector lever control instrument. This is because, both for a communication failure in the transmission control instrument and also in the selector lever control instrument, it could happen that the parking position of the automatic transmission, that is, a parking lock of the automatic transmission, can no longer be activated. Owing to the fact that, in a case of this kind, the corresponding warning message is displayed, by means of which it is signaled that the driver should actuate the electronic parking brake, it is possible to prevent the motor vehicle from rolling, even when there is a communication failure of the transmission control instrument and/or of the selector lever control instrument.

In accordance with another advantageous embodiment of the invention, it is provided that the display control instrument actuates the display device for display of a warning message, by means of which it is signaled that the driver should take safety measures that differ from an actuation of the electronic parking brake and from an actuation of the automatic transmission if it is detected that a communication failure is present in the parking brake control instrument and in the transmission control instrument. For example, it could be indicated by means of the warning message that the driver should park the motor vehicle only on a level surface, that is, in an area without inclines. Alternatively or additionally, it is also possible to signal by means of the warning message that the driver should turn the steerable wheels of the motor vehicle in such a way that one of the wheels rests against the curb at an angle to the direction of travel. Alternatively or additionally, it is also possible to signal by means of the warning message that the driver should drive directly to a repair shop. By means of the corresponding warning message, the driver of the motor vehicle thus recognizes in a simple way that there exists at least the danger that both the parking brake and also the automatic transmission of the motor vehicle are no longer capable of safely parking the motor vehicle.

In another advantageous embodiment of the invention, it is provided that the display control instrument controls the display device for display of a warning message, by means of which it is signaled that the driver should park the motor vehicle if it is detected that a communication failure is present for at least one of the monitored control instruments. In other words, it can thus be provided that a general driver warning is output if it is detected that, in at least one of the monitored control instruments, that is, in the transmission control instrument, in the selector lever control instrument, and/or in the parking brake control instrument, a communication failure is present. In this context, it can be provided, for example, that, by means of the is present warning message, it is signaled in detail which of the monitored control instruments has just had a communication failure and thus also, with high likelihood, also a functional failure. The driver of the motor vehicle will therefore be informed, preferably unambiguously, about which of the monitored control instruments that are necessary for safe parking of the motor vehicle have just had a malfunction.

Another advantageous embodiment of the invention provides that the display control instrument actuates the display device for display of the respective warning messages only when it has been detected that an ignition of the motor vehicle has been deactivated. In other words, it can thus be provided that the respective warning messages are displayed only when a state "Terminal 15 off" has been detected. Therefore, at the latest when the motor vehicle is parked, the driver will be informed about which malfunctions are present just then for the monitored control instruments.

In another advantageous embodiment of the invention, it is provided that the transmission control instrument automatically engages the park stage of the automatic transmission once an ignition of the motor vehicle is deactivated and if it has been detected that a communication failure of the selector lever control instrument and/or of the parking brake control instrument is present. In particular, therefore, the transmission control instrument automatically also engages the park stage of the automatic transmission when, if the motor vehicle is parked and, in particular, when the ignition of the motor vehicle is deactivated, the idling stage of the automatic transmission was still engaged beforehand, if a communication failure of the selector lever control instrument and/or of the parking brake control instrument is present. Even when, on account of a malfunction of the parking brake control instrument, it should no longer be possible to activate the electronic parking brake and/or, on account of a malfunction of the selector lever control instrument, it should no longer be possible to engage manually the parking position in the automatic transmission, it is ensured through automatic engagement of the park stage of the automatic transmission that the motor vehicle can be safely parked so as to prevent it from rolling.

Another advantageous embodiment of the invention provides that the parking brake control instrument automatically activates the parking brake once an ignition of the motor vehicle is deactivated and if it has been detected that a communication failure of the transmission control instrument is present. For example, should it not be possible, therefore, to engage the parking position in the automatic transmission at all on account of an existing communication failure of the transmission control instrument, then it can be ensured nonetheless through the automatic activation of the parking brake that the motor vehicle does not roll when it is parked.

The monitoring apparatus according to the invention for operating a motor vehicle is designed for the purpose of monitoring whether a communication failure is present between a transmission control instrument of an automatic transmission of the motor vehicle, a selector lever control instrument of the automatic transmission, and/or a parking brake control instrument of an electronic parking brake of the motor vehicle. Alternatively or additionally, the monitoring apparatus is designed to monitor whether, on account of a malfunction of the automatic transmission itself and/or on account of a malfunction of a selector lever itself for selection of drive stages of the automatic transmission, a parking position of the automatic transmission cannot be engaged. The monitoring apparatus is designed to operate the transmission control instrument, the parking control instrument, and a display control instrument of a display device of the motor vehicle depending on the monitored controlled instruments between which a communication failure has been detected and/or whether the parking position cannot be engaged on account of a malfunction of the automatic transmission itself and/or on account of a malfunction of the selector lever itself. Advantageous embodiments of the method according to the invention are to be regarded as advantageous embodiments of the monitoring apparatus according to the invention, with the monitoring apparatus, in particular, having means for carrying out the steps of the method.

The motor vehicle according to the invention comprises the monitoring apparatus according to the invention or an advantageous embodiment of the monitoring apparatus according to the invention.

Further advantages, features, and details of the invention ensue from the following description of a preferred exemplary embodiment as well as on the basis of the drawing. The features and combinations of features mentioned above in the description as well as the features and combinations of features mentioned below in the description of the FIGURES as well as the features and combinations of features mentioned in the description of the FIGURE and/or shown solely in the single FIGURE can be used not only in the respectively presented combination, but also in other combinations or alone, without departing from the scope of the invention.

BRIEF DESCRIPTION OF THE FIGURE

FIG. 1 shows a schematic illustration of a motor vehicle, which comprises a transmission control instrument, a selector lever control instrument, a parking brake control instrument, and a display control instrument, which are connected to two different bus segments of a bus system of the motor vehicle and are in communication connection with each other.

DETAILED DESCRIPTION OF THE FIGURE

A motor vehicle 10 is shown in a schematic illustration in FIG. 1. The motor vehicle 10 comprises a transmission control instrument 12 for control of an automatic transmission 14, a selector lever control instrument 16, which is connected to a selector lever 18 for selection of drive stages of the automatic transmission 14, a parking brake control instrument 20 for actuating an electronic parking brake 22, and a display control instrument 24 for actuating a display device 26 of the motor vehicle 10.

The transmission control instrument 12 and the parking brake control instrument 20 are connected to a first bus segment 28 of a bus system, which is not indicated in greater detail, of the motor vehicle 10. The selector lever control instrument 16 and the display control instrument 24 are connected to a second bus segment 30 of the bus system of the motor vehicle 10. In this case, the communication between the two bus segments 28, 30 can take place by way of a gateway control instrument 32. In particular, the communication between the selector lever control instrument 16 and the transmission control instrument 12 takes place by way of the gateway control instrument 32.

If a driver wants, for example, to act manually on the selection of the gear stage of the automatic transmission 14, then the driver actuates the selector lever 18 correspondingly, in consequence of which the selector lever control instrument 16 detects the gear selection in accordance with the actuation of the selector lever 18 and then conveys this information to the transmission control instrument 12, in consequence of which the transmission control instrument 12 actuates the automatic transmission 14 in accordance with the detected actuation of the selector lever 18.

Usually, when the motor vehicle 10 is parked, it is possible both to actuate the electronic parking brake 22 and also to engage a parking position P in the automatic transmission 14 in order to secure the motor vehicle 10 redundantly against rolling. However, it can happen that communication failures may occur in the transmission control instrument 12, in the selector lever control instrument 16, and/or in the parking brake control instrument 20.

When there is a communication failure of the transmission control instrument 12, it may happen that the parking position P in the automatic transmission 14, in spite of a corresponding actuation of the selector lever 18, can no longer be engaged. That same thing may also happen when there is a breakdown of the selector lever control instrument 16 if it is affected by a communication failure, because, for example, a corresponding signal detection of an actuation of the selector lever 18 by the selector lever control instrument 16 is disrupted, or because conveyance of a signal from the selector lever control instrument 16 to the transmission control instrument 12 is disrupted.

In contrast, should the parking brake control instrument 20 be affected by a communication failure, then it may happen that, in spite of a corresponding actuation of a parking brake switch, the electronic parking brake 22 of the motor vehicle 10 cannot be activated.

In the following, a method for safe parking of the motor vehicle 10 will be explained in greater detail. The method here is based on a redundancy concept for securing the parked vehicle 10 against rolling, wherein the securing of the motor vehicle 10 against rolling is distributed, depending on the task, over the transmission control instrument 12, the parking brake control instrument 20, and the display control instrument 24.

In this case, a warning function is assigned to the display control instrument 24 in that the display control instrument 24 actuates the display device 26 for display of diverse warning messages if the driver is to be informed about communication failures of the transmission control instrument 12, of the selector lever control instrument 16, and/or of the parking brake control instrument 20. If it is detected that, in the parking brake control instrument 20, a communication failure is present, the display control instrument 24 actuates the display device 26 for display of a warning message, by means of which it is signaled that the driver should engage the parking position P in the automatic transmission 14. Preferably, the display device 26 involves an instrument panel of the motor vehicle 10, so that the corresponding warning message is displayed as directly as possible in the field of vision of the driver.

If it is detected that, in the transmission control instrument 12 and/or in the selector lever control instrument 16, a communication failure is present, the display control instrument 24 actuates the display device 26 for display of a warning message, by means of which it is signaled that the driver should actuate the electronic parking brake 22. This is because, when there is a communication failure of the transmission control instrument 12 and/or of the selector lever control instrument 16, there exists at least the danger that the parking position P in the automatic transmission 14 can no longer be engaged when the motor vehicle 10 is parked. Owing to the fact that the driver is alerted to actuate the electronic parking brake 22, it is possible, in spite of a malfunction during engagement of the parking position, to prevent the motor vehicle from rolling.

In contrast, should it be detected that, both in the parking brake control instrument 20 and also in the transmission control instrument 12, a communication failure is present, the display control instrument 24 actuates the display device 26 for display of a warning message, by means of which it is signaled that the driver the motor vehicle 10 should park only on a level surface without inclines and turn the front wheels in such a way that one of the front wheels rests against a curb, and/or that the driver should drive directly to a repair shop. This is because, in the case that a communication failure is present both in the parking brake control instrument 20 and also in the transmission control instrument 12, it is no longer possible under certain circumstances to secure the parked motor vehicle 10 against rolling. Through display of said warning messages, the driver can be informed that he is highly unlikely to be able either to actuate the electronic parking brake 22 or to engage the parking position P in the automatic transmission 14.

Beyond this, it can be provided that the display control instrument 24 actuates the display device 26 for display of a warning message, by means of which it is signaled that the driver should park the motor vehicle 10 if it is detected that a communication failure is present for at least one of the monitored control instruments 12, 16, 20. Furthermore, the display control instrument 24 can also actuate the display device 26 in such a way that, by means of the display device 26, it is displayed which of the monitored control instruments 12, 16, 20 has just been affected by a malfunction.

Preferably, the display control instrument 24 actuates the display device 26 for display of the respective warning messages only when it has been detected that an ignition of the motor vehicle 10 has been deactivated, that is, for example, a state "Terminal 15 off" exists.

Besides the purely informational and warning function by way of the corresponding actuation of the display device 26, a holding function is assigned to the transmission control instrument 12 when the motor vehicle 10 is being parked. The transmission control instrument 12 automatically engages the park stage P of the automatic transmission 14 once an ignition of the motor vehicle 10 is deactivated and if it has been detected that a communication failure of the selector lever control instrument 16 and/or of the parking brake control instrument 20 is present. In particular, the transmission control instrument 12 also automatically engages the park stage P of the automatic transmission 14 in the case that, when the ignition of the motor vehicle 10 is deactivated, an idling stage or a neutral stage N of the automatic transmission 14 was engaged beforehand, if it has been detected that a communication failure of the selector lever control instrument 16 and/or of the parking brake control instrument 20 is present.

Normally, the park stage P is not automatically engaged by the transmission control instrument 12 when, during parking of the motor vehicle 10, the neutral stage N was engaged. This will occur, however, if a communication failure of the selector lever control instrument 16 and/or of the parking brake control instrument 20 is present. This is because, should the driver not be able to engage the park stage P through actuation of the selector lever 18 or should the engagement or actuation of the parking brake 22 be disrupted, then, through automatic engagement of the park stage P, it can be ensured that the motor vehicle 10 does not roll away after it has been parked.

A holding function of the motor vehicle 10 is likewise assigned to the parking brake control instrument 20 if the other monitored control instruments 12, 16 should have a communication failure. The parking brake control instrument 20 automatically activates the parking brake 22 once an ignition of the motor vehicle 10 is deactivated and if it has been detected that a communication failure of the transmission control instrument 12 and/or of the selector lever control instrument 16 is present. In this way, it can likewise be ensured that the parked motor vehicle 10 does not roll, even when it should no longer be possible to engage the parking position P.

The transmission control instrument 12, the selector lever control instrument 16, and the parking brake control instrument 20 do not initiate independently the output of warning messages, so that duplicate warning messages can be prevented. This is because the warning function is assigned solely to the display control instrument 24, which, in the described cases, initiates corresponding warning messages by way of the display device 26.

The transmission control instrument 12, the parking brake control instrument 20, and the display control instrument 24 together constitute, therefore, a kind of monitoring apparatus, by means of which the parked motor vehicle 10 can be secured against rolling. A secure parking of the motor vehicle 10 can also be ensured even when there is a failure of one of the monitored control instruments 12, 16, 20, whether this be via corresponding warnings to the driver or via the described automatic holding functions, triggered by the transmission control instrument 12 and/or by the parking brake control instrument 20.

Warning messages and error messages are handled centrally by the display control instrument 24, as a result of which multiple and redundant error warnings can be prevented. Beyond this, there ensues an optimal division of the error handling over the two participating bus segments 28, 30. Furthermore, through the clear division of the error measures among the respective control instruments 12, 20, 24, it is prevented that different error responses due to the same malfunctions of the monitored control instruments 12, 16, 20 are triggered. A limitation to the necessary measures can thus be ensured in each case.

The invention claimed is:

1. A method for operating a motor vehicle, comprising:
    monitoring, by transmission control unit, when a communication failure is present between the transmission control instrument of an automatic transmission of the motor vehicle, a selector lever control instrument of the automatic transmission, and/or a parking brake control instrument of an electronic parking brake of the motor vehicle;
    and/or monitoring, by the transmission control unit, when, on account of a malfunction of the automatic transmission itself and/or on account of a malfunction of a selector lever itself for selection of drive stages of the automatic transmission, a parking position of the automatic transmission cannot be engaged;
    operating the transmission control instrument, of the parking brake control instrument and of a display control instrument of a display device of the motor vehicle depending on the monitored control instruments between which a communication failure has been detected, and/or when the parking position cannot be engaged on account of a malfunction of the automatic transmission itself and/or on account of a malfunction of the selector lever itself wherein the display control instrument actuates the display device for display of a warning message to the driver.

2. The method according to claim 1, wherein the display control instrument signals that the driver should engage the parking position in the automatic transmission if it is detected that a communication failure is present in the parking brake control instrument.

3. The method according to claim 1, wherein the display control instrument signals that the driver should engage the electronic parking brake if it is detected that a communication failure is present in the transmission control instrument and/or in the selector lever control instrument.

4. The method according to claim 1, wherein the display control instrument signals that the driver should take safety measures differing from an actuation of the electronic parking brake and from an actuation of the automatic transmission if it is detected that a communication failure is present in the parking brake control instrument and in the transmission control instrument.

5. The method according to claim 1, wherein the display control instrument signals that the driver should park the motor vehicle if it is detected that a communication failure is present for at least one of the monitored control instruments.

6. The method according to claim 2, wherein the display control instrument actuates the display device for display of the warning message only when it has been detected that an ignition of the motor vehicle has been deactivated.

7. The method according to claim 1, wherein the transmission control instrument automatically engages the parking position of the automatic transmission once an ignition of the motor vehicle is deactivated and if it has been detected that a communication failure of the selector lever control instrument and/or of the parking brake control instrument is present.

8. The method according to claim 1, wherein the parking brake control instrument automatically activates the parking brake once an ignition of the motor vehicle is deactivated and if it has been detected that a communication failure of the transmission control instrument is present.

9. A monitoring apparatus for operating a motor vehicle, comprising:
    a transmission control instrument configured to monitor when a communication failure is present between the transmission control instrument of an automatic transmission of the motor vehicle, a selector lever control instrument of the automatic transmission, and/or a parking brake control instrument of an electronic parking brake of the motor vehicle;
    and/or monitor when, on account of a malfunction of the automatic transmission itself and/or on account of a malfunction of a selector lever itself for selection of drive stages of the automatic transmission, a parking position of the automatic transmission cannot be engaged;
    wherein the transmission control instrument, the parking control instrument, and a display control instrument of a display device of the motor vehicle are operated depending on the monitored control instruments between which a communication failure has been detected, and/or whether the parking position cannot be engaged on account of a malfunction of the automatic transmission itself and/or on account of a malfunction of the selector lever itself.

* * * * *